US012785508B2

(12) United States Patent
Kim et al.

(10) Patent No.: US 12,785,508 B2
(45) Date of Patent: Nov. 3, 2026

(54) COOLING GUIDE STRUCTURE OF MOTOR

(71) Applicant: HYUNDAI MOBIS CO., LTD., Seoul (KR)

(72) Inventors: Sangjin Kim, Yongin-si (KR); Hee Seo Park, Suwon-si (KR); Jung Kyu Yim, Hwaseong-si (KR); Tae Woo Kang, Yongin-si (KR); Seung Ho Lee, Seoul (KR); Jong Jin Park, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 190 days.

(21) Appl. No.: 18/743,193

(22) Filed: Jun. 14, 2024

(65) Prior Publication Data

US 2025/0079939 A1 Mar. 6, 2025

(30) Foreign Application Priority Data

Sep. 1, 2023 (KR) ........................ 10-2023-0116174

(51) Int. Cl.

*H02K 1/20* (2006.01)
*H02K 5/20* (2006.01)
*H02K 9/19* (2006.01)

(52) U.S. Cl.

CPC ................. *H02K 9/19* (2013.01); *H02K 1/20* (2013.01); *H02K 5/203* (2021.01)

(58) Field of Classification Search

CPC .. H02K 1/20; H02K 3/24; H02K 5/20; H02K 5/203; H02K 9/19; H02K 9/193
See application file for complete search history.

(56) References Cited

FOREIGN PATENT DOCUMENTS

| | | | | |
|---|---|---|---|---|
| CN | 214314940 | U | * | 9/2021 |
| CN | 116247840 | A | | 6/2023 |
| DE | 10 2021 111 700 | A1 | | 11/2022 |
| EP | 4 236 036 | A1 | | 8/2023 |
| FR | 3 122 052 | A1 | | 10/2022 |
| JP | 2004180376 | A | * | 6/2004 |
| JP | 2012231647 | A | * | 11/2012 |

OTHER PUBLICATIONS

Sun, Machine Translation of CN214314940, Sep. 2021 (Year: 2021).*
Sugimoto, JP2012231647 Machine Translation, Nov. 2012 (Year: 2012).*
Matsui, Machine Translation of JP2004180376, Jun. 2004 (Year: 2004).*
Extended European Search Report issued on Dec. 9, 2024 in European Patent Application No. 24184547.8.

* cited by examiner

*Primary Examiner* — Eric Johnson
(74) *Attorney, Agent, or Firm* — Morgan, Lewis & Bockius LLP

(57) ABSTRACT

Provided is a cooling guide structure of a motor, which may effectively cool a coil by being provided with a cooling guide including a guide part for spraying oil cooling the coil to various parts of the coil.

15 Claims, 13 Drawing Sheets

[FIG. 7]
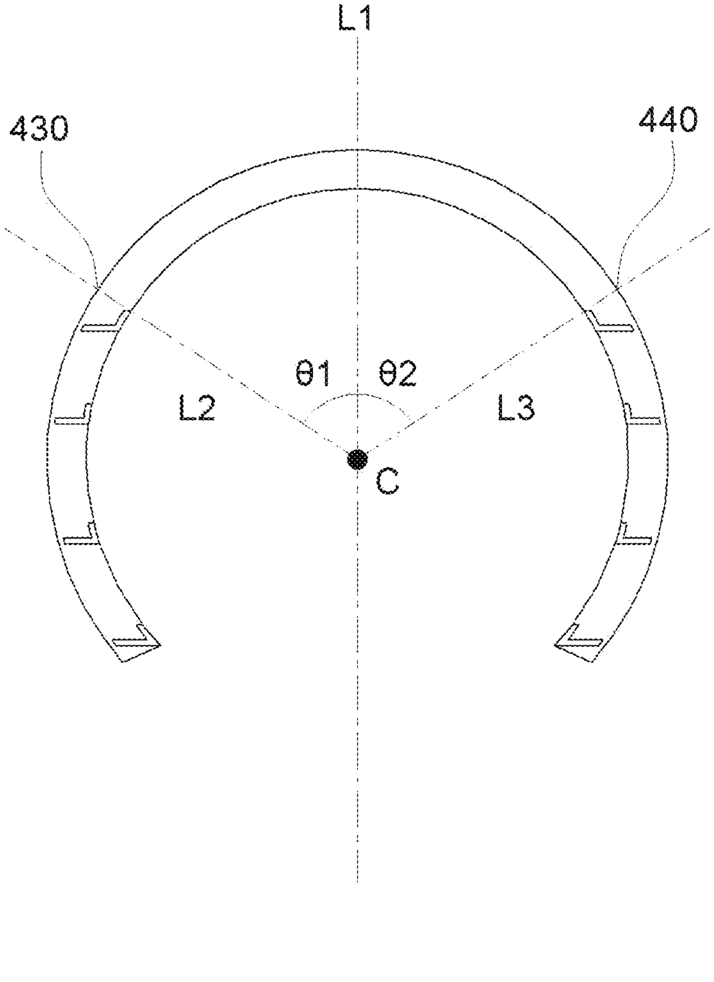

[FIG. 8]
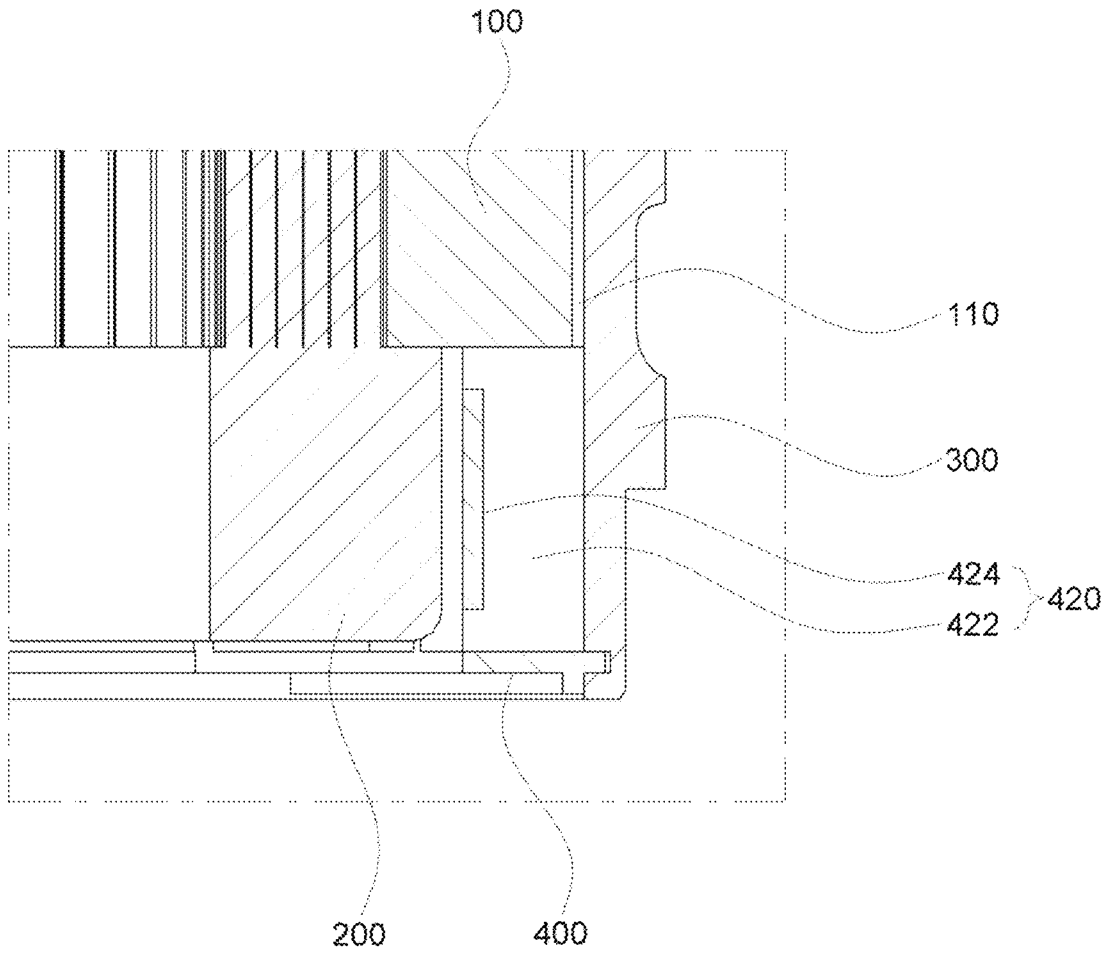

[FIG. 9]
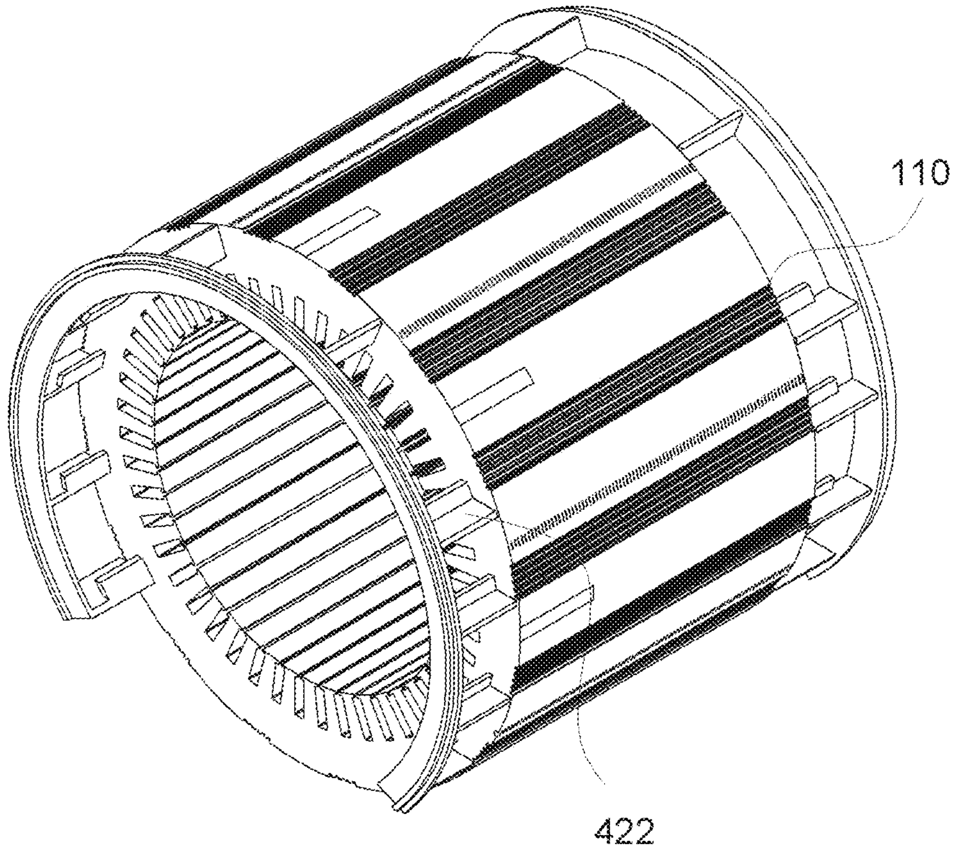

[FIG. 10]
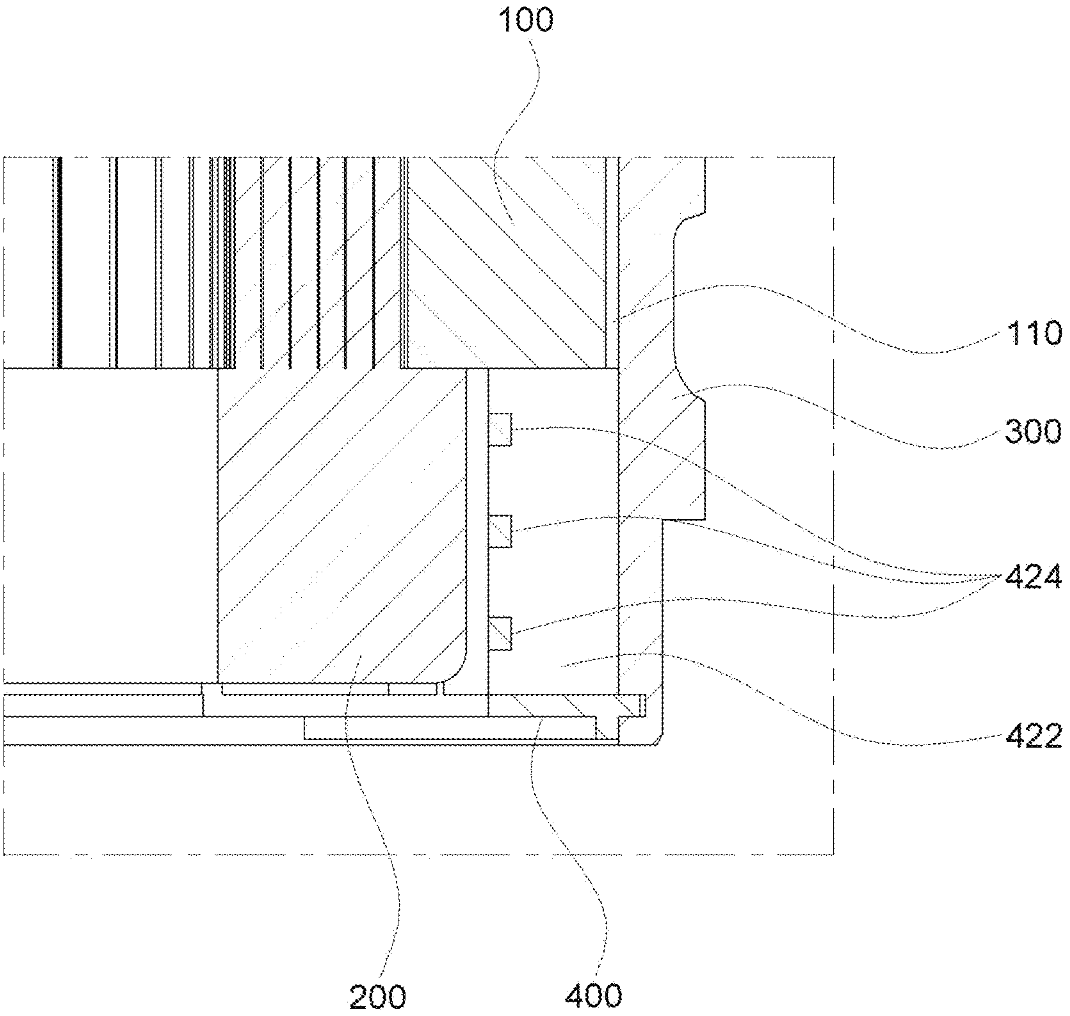

[FIG. 11]
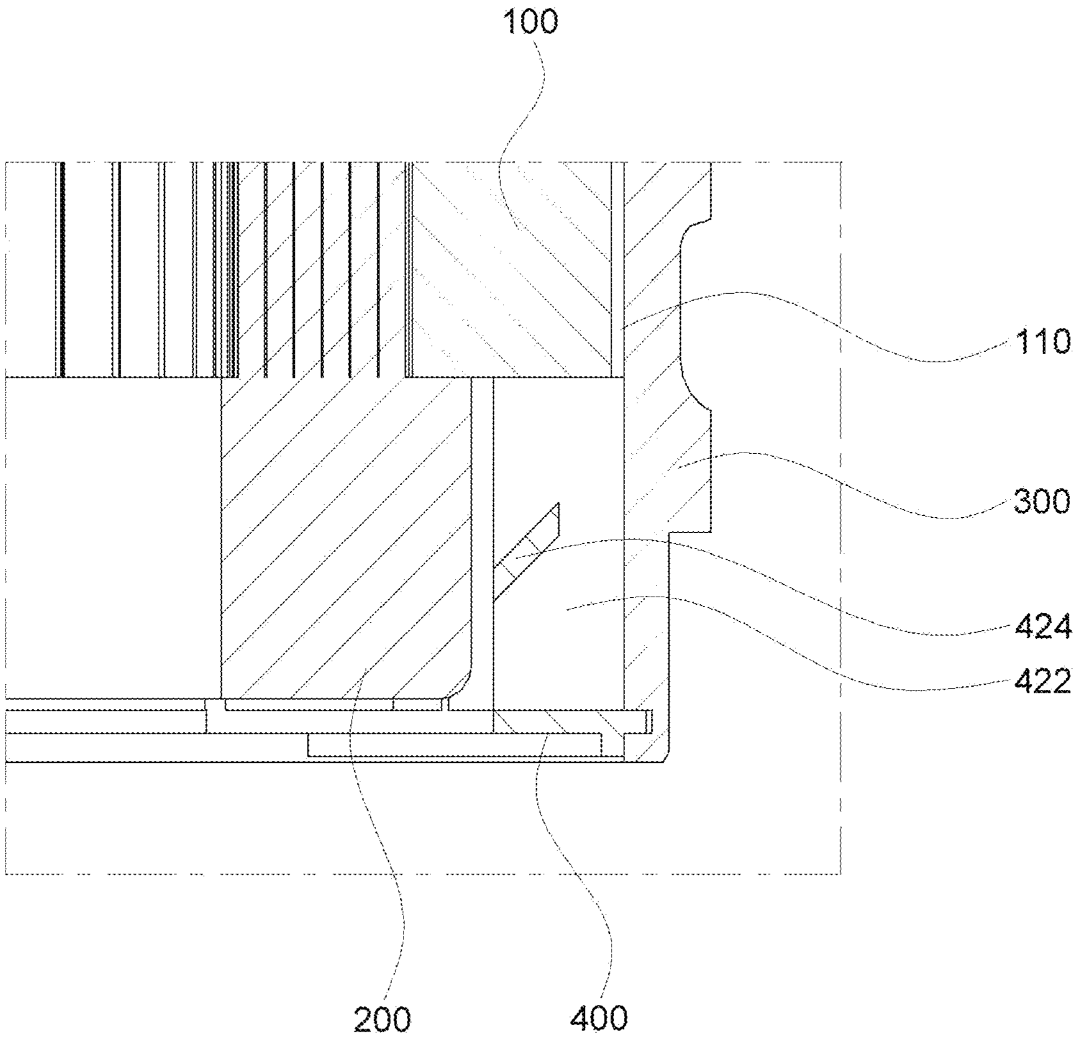

[FIG. 12]
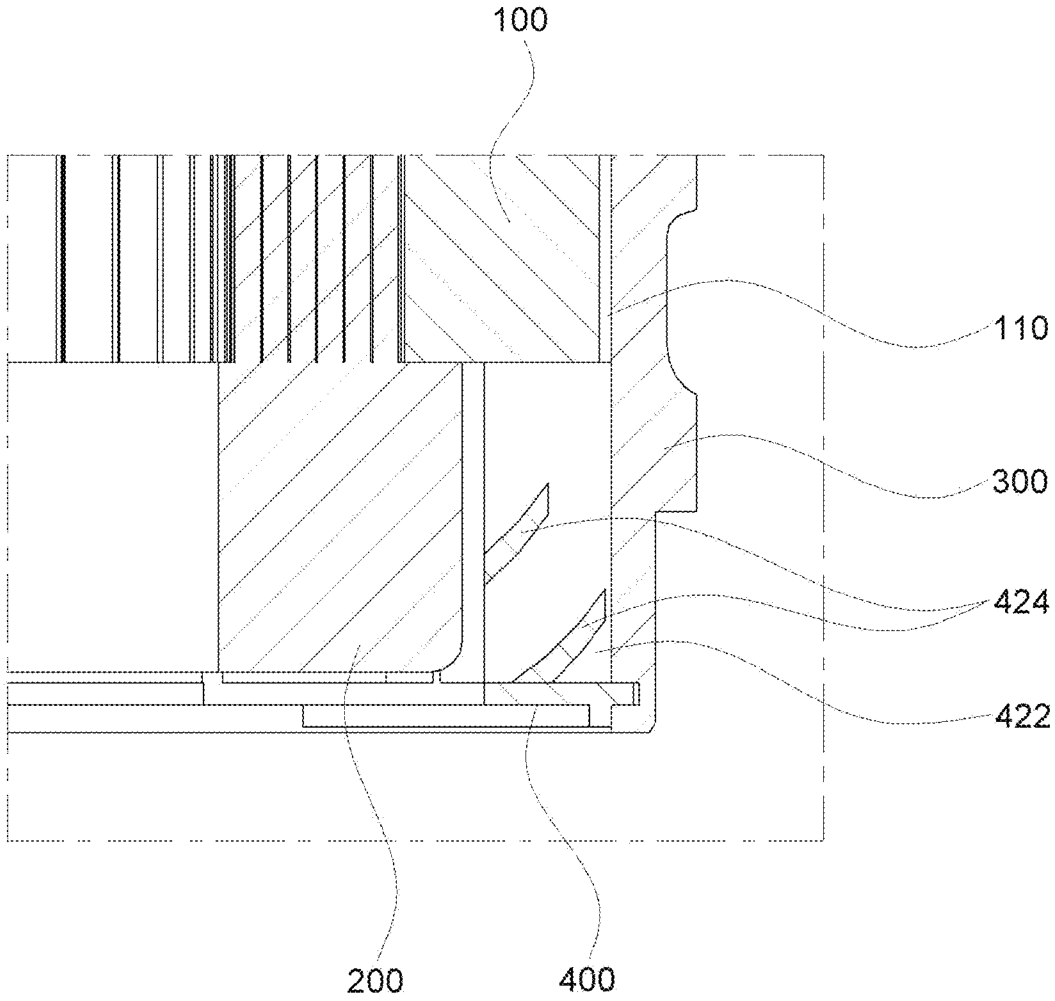

[FIG. 13]
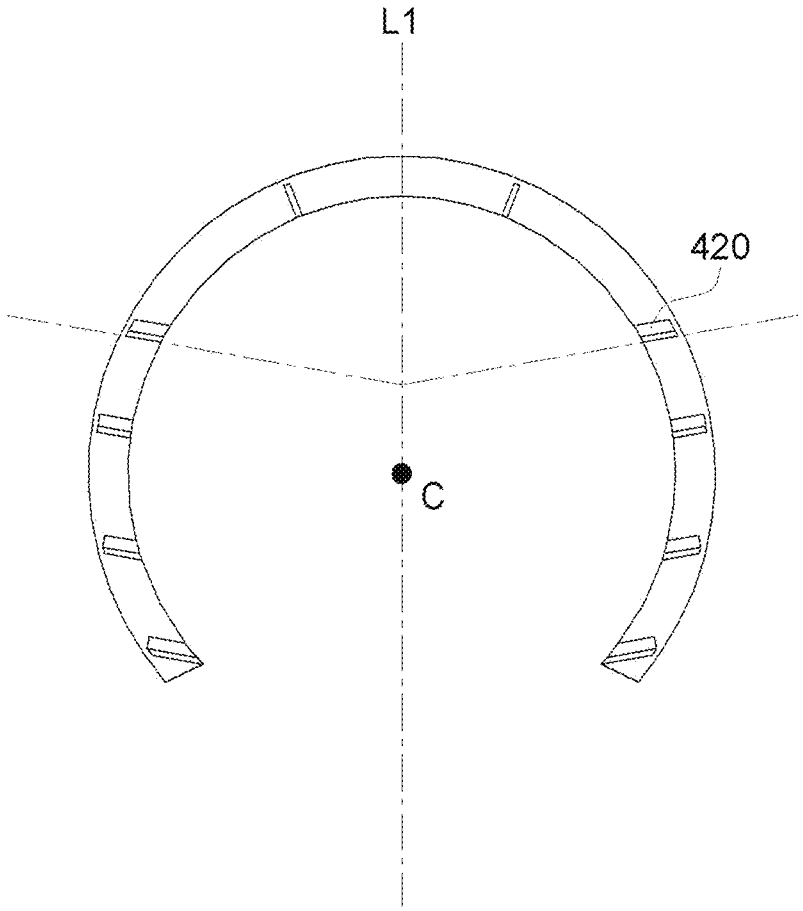

COOLING GUIDE STRUCTURE OF MOTOR

CROSS-REFERENCE TO RELATED APPLICATIONS

This application claims priority under 35 U.S.C. § 119 to Korean Patent Application No. 10-2023-0116174, filed on Sep. 1, 2023, in the Korean Intellectual Property Office, the disclosure of which is incorporated herein by reference in its entirety.

TECHNICAL FIELD

The following disclosure relates to a cooling guide structure of a motor, and more particularly, to a cooling guide structure of a motor, which may effectively cool a coil by spraying oil for cooling the coil installed on the motor not only to an upper part of the coil but also to its lower part.

BACKGROUND

A cooling guide of a motor may guide a movement of oil for oil to be sprayed to a coil installed on the motor, thus cooling the coil.

FIG. 1 is a view showing a conventional cooling guide, and FIG. 2 is a view showing a cooling guide structure of a conventional motor.

Referring to FIGS. 1 and 2, when a cooling guide 1000 is installed in a cooling guide structure 2000 of the motor, oil flowing into the motor may be first sprayed to the cooling guide 1000, and oil sprayed to the cooling guide 1000 may then hit the cooling guide 1000 to be moved to a coil.

However, oil hitting the cooling guide 1000 may fall downward due to gravity, and accordingly, oil may be sprayed only to an upper part of the coil and may hardly be sprayed to a lower part of the coil. That is, oil may not be sprayed to various parts of the coil where heat occurs, and the cooling guide structure 2000 of the motor may thus fail to cool the coil more effectively.

Therefore, it is necessary to develop a cooling guide structure of a motor that may cool the coil more effectively by spraying oil to the various parts of the coil.

SUMMARY

An embodiment of the present invention is directed to providing a cooling guide structure of a motor, which may effectively cool a coil by spraying oil also to a lower part of the coil on the motor.

Another embodiment of the present invention is directed to providing a cooling guide structure of a motor, which may effectively cool a coil by spraying oil also to the front part and side part of the coil on the motor.

Aspects of the present invention are not limited to those mentioned above, and other aspects not mentioned here may be obviously understood by those skilled in the art from the following description.

In one general aspect, provided is a cooling guide structure of a motor, the structure including: a stator core formed in a shape of a hollow cylinder extending in a length direction, and having a plurality of first grooves formed in its outer peripheral surface in the length direction; a coil installed in the stator core to have at least a portion protruding to one end of the stator core in the length direction or the other end of the stator core in the length direction; a housing including an oil inlet formed in its outer peripheral surface and allowing oil to flow in, having a second groove formed in its inner peripheral surface and communicating with the oil inlet, and installed on the outer peripheral surface of the stator core for oil flowing into the oil inlet and flowing through the second groove to flow into the plurality of first grooves and be discharged to the one end of the stator core in the length direction or the other end of the stator core in the length direction; and a cooling guide having a first surface and a second surface, formed in a shape of a ring with a portion cut off, installed at one end of the housing in the length direction or the other end of the housing in the length direction for the first surface to face the stator core, and including a plurality of guide parts guiding a movement of oil for oil discharged from the first groove to be moved to the coil, wherein the guide part includes a first member protruding from the first surface and disposed to be flat in a direction perpendicular to gravity, and a second member protruding upward from the first member and guiding the movement of oil for oil accommodated in an upper part of the first member to be moved to the coil, and the guide part is formed on the other part of the cooling guide except for an upper part of the cooling guide.

The cooling guide may have the first member facing an outer peripheral surface of the coil, the cooling guide installed at the one end of the housing in the length direction may have the first surface disposed to be further from the stator core than one end of the coil in the length direction, and the cooling guide installed at the other end of the housing in the length direction may have the first surface disposed to be further from the stator core than the other end of the coil in the length direction.

The first member may be in close contact with the inner peripheral surface of the housing and spaced apart from the coil by a first distance when the cooling guide is installed in the housing, and the second member may be spaced apart from the coil by a second distance when the cooling guide is installed in the housing.

The cooling guide may have the upper part disposed between the first point and second point of the cooling guide, having an angle of 30 degrees or more and 90 degrees or less between a first line segment passing through a center of the cooling guide and extending in a direction parallel to the gravity and a second line segment passing through the first point and the center of the cooling guide, and having the angle of 30 degrees or more and 90 degrees or less between the first line segment and a third line segment passing through the second point and the center of the cooling guide.

In the guide part, an upper surface of the first member may be spaced apart in a downward manner by a predetermined distance from one end of the first groove or the other end of the first groove.

The second member may be formed in a shape of a plate disposed on one side of the first member that is adjacent to the coil to face the coil while being spaced apart from the first surface for oil accommodated in the first member to be discharged to the one end of the coil in the length direction, the other end of the coil in the length direction, and a portion of the coil that faces the first member.

The second member may be formed in a shape of a plurality of plates disposed on one side of the first member that is adjacent to the coil to face the coil while being spaced apart from each other for oil accommodated in the first member to be discharged to the one end of the coil in the length direction, the other end of the coil in the length direction, and a portion of the coil that faces the first member.

The second member may be formed in a shape of at least one plate inclined at a predetermined angle with respect to the length direction for oil accommodated in the first member to be discharged to the one end of the coil in the length direction, the other end of the coil in the length direction, and a portion of the coil that faces the first member.

The second member may be formed in a shape of a curved plate.

In another general aspect, provided is a cooling guide structure of a motor, the structure including: a stator core formed in a shape of a hollow cylinder extending in a length direction, and having a plurality of first grooves formed in its outer peripheral surface in the length direction; a coil installed in the stator core to have at least a portion protruding to one end of the stator core in the length direction or the other end of the stator core in the length direction; a housing including an oil inlet formed in its outer peripheral surface and allowing oil to flow in, having a second groove formed in its inner peripheral surface and communicating with the oil inlet, and installed on the outer peripheral surface of the stator core for oil flowing into the oil inlet and flowing through the second groove to flow into the plurality of first grooves and to be discharged to the one end of the stator core in the length direction or the other end of the stator core in the length direction; and a cooling guide having a first surface and a second surface, formed in a shape of a ring with a portion cut off, installed at one end of the housing in the length direction or the other end of the housing in the length direction for the first surface to face the stator core, and including a plurality of guide parts guiding a movement of oil for oil discharged from the first groove to be moved to the coil, wherein the guide part includes a first member protruding from the first surface and disposed to be flat to be inclined at a predetermined angle with respect to a plane perpendicular to gravity, and a second member protruding upward from the first member and guiding the movement of oil for oil accommodated in an upper part of the horizontal member to be moved to the coil, the guide part is formed on the other part of the cooling guide except for an upper part of the cooling guide, and the plurality of guide parts have the first members respectively inclined downward toward a first line segment passing through a center of the cooling guide and parallel to the gravity, and symmetrical to each other based on the first line segment.

The cooling guide may have the first member facing an outer peripheral surface of the coil, the cooling guide installed at the one end of the housing in the length direction may have the first surface disposed to be further from the stator core than one end of the coil in the length direction, and the cooling guide installed at the other end of the housing in the length direction may have the first surface disposed to be further from the stator core than the other end of the coil in the length direction.

The first member may be in close contact with the inner peripheral surface of the housing and is spaced apart from the coil by a first distance when the cooling guide is installed in the housing, and the second member may be spaced apart from the coil by a second distance when the cooling guide is installed in the housing.

The cooling guide may have the upper part disposed between the first point and second point of the cooling guide, having an angle of 30 degrees or more and 90 degrees or less between the first line segment and a second line segment passing through the first point and the center of the cooling guide, and having the angle of 30 degrees or more and 90 degrees or less between the first line segment and a third line segment passing through the second point and the center of the cooling guide.

In the guide part, an upper surface of the first member may be spaced apart in a downward manner by a predetermined distance from one end of the first groove or the other end of the first groove.

The second member may be formed in a shape of a plate disposed on one side of the first member that is adjacent to the coil to face the coil while being spaced apart from the first surface for oil accommodated in the first member to be discharged to the one end of the coil in the length direction, the other end of the coil in the length direction, and a portion of the coil that faces the first member.

The housing may have a coupling groove formed in its inner peripheral surface, and the cooling guide has a coupling protrusion formed on its outer peripheral surface and is made of an elastic material to be installed in the housing as the coupling protrusion is inserted into the coupling groove.

Details of other embodiments are included in the description and drawings of the present invention.

Other features and aspects will be apparent from the following detailed description, the drawings, and the claims.

BRIEF DESCRIPTION OF THE DRAWINGS

FIG. 7 is a view for explaining a position where a guide part is formed on the cooling guide.

FIG. 8 is a cross-sectional view showing a portion of the cooling guide structure of the motor.

FIG. 9 is a view for explaining the position where the guide part of the cooling guide is formed based on a position of a first groove of the stator core.

FIG. 10 is a cross-sectional view showing a portion of the cooling guide structure of the motor that is provided with a guide part including a second member formed in a shape of a plurality of plates.

FIG. 11 is a cross-sectional view showing a portion of the cooling guide structure of the motor that is provided with the guide part including the second member formed in a shape of a plate inclined at a predetermined angle with respect to a length direction.

FIG. 12 is a cross-sectional view showing a portion of the cooling guide structure of the motor that is provided with the guide part including the second member formed in a shape of a curved plate.

FIG. 13 is a view showing the cooling guide of the motor provided with the guide part including a first member inclined downward.

DETAILED DESCRIPTION OF EMBODIMENTS

Figure 1:
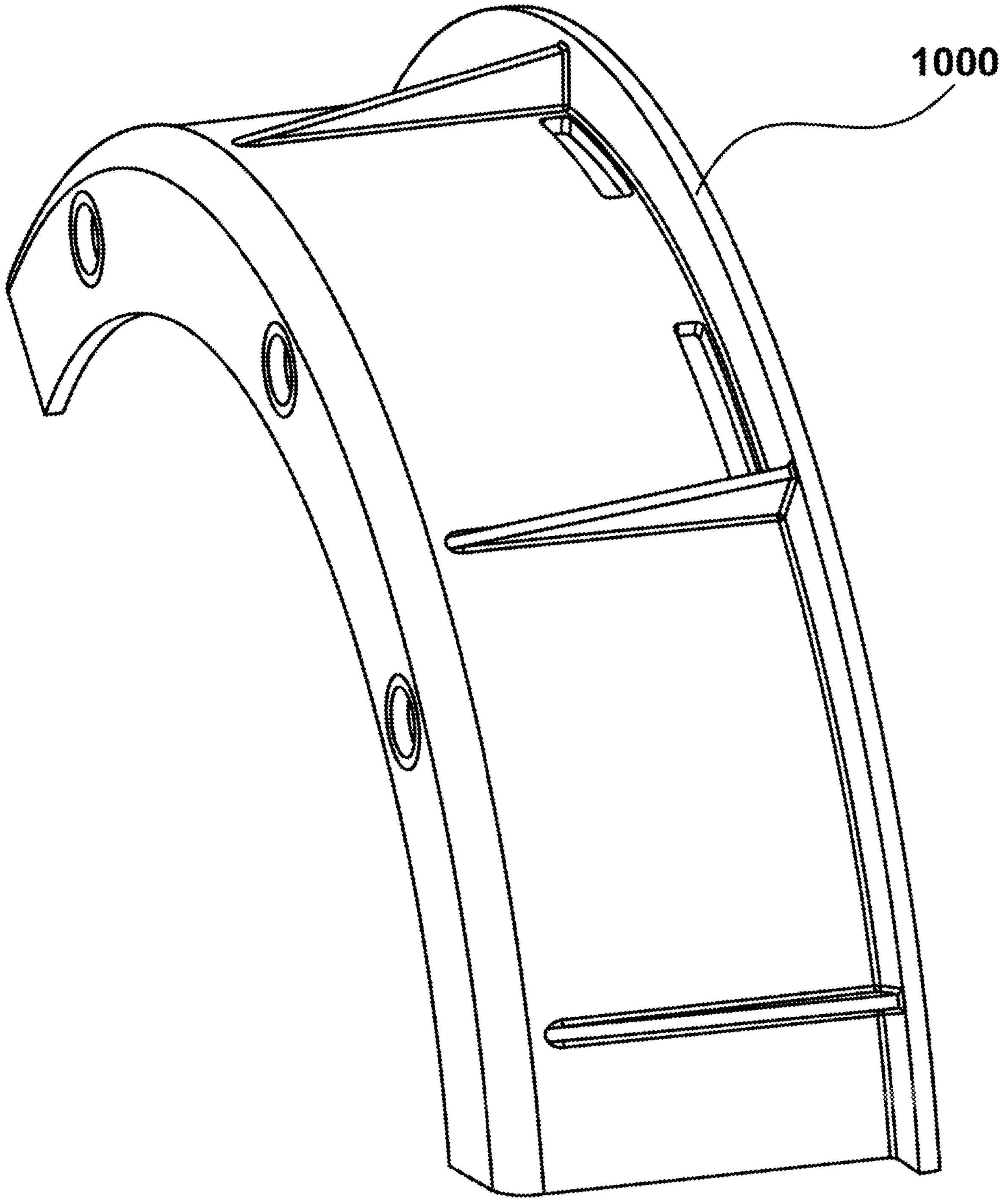
FIG. 1 is a view showing a conventional cooling guide.
Figure 2:
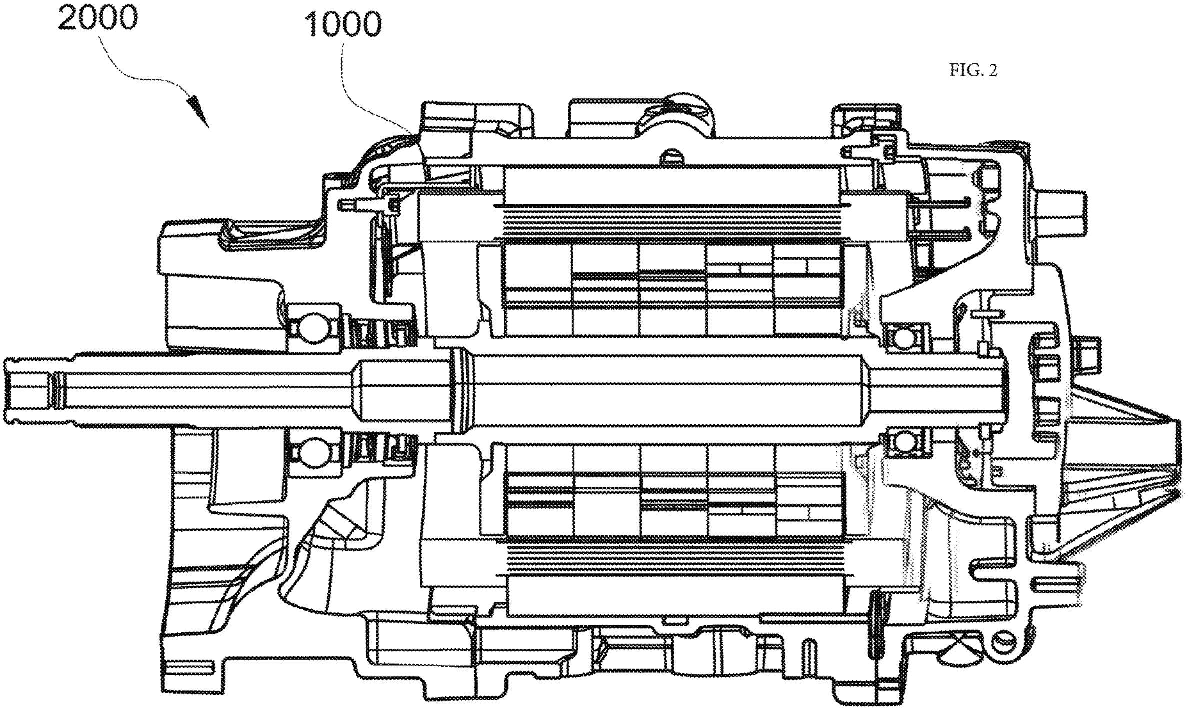
FIG. 2 is a view showing a cooling guide structure of a conventional motor.

Hereinafter, embodiments are described in detail with reference to the accompanying drawings to be easily practiced by those skilled in the art to which the present invention pertains. However, the present invention may be implemented in various different forms and is not limited to the embodiments described herein. In addition, in the drawings, portions unrelated to the description are omitted to clearly describe the present invention, and similar portions are denoted by similar reference numerals throughout the specification.

Throughout the specification, when one part is referred to as being "connected to" another part, one part and another part may be "directly connected to" each other, or may be "electrically connected to" each other with a third part interposed therebetween.

Throughout the specification, when one member is referred to as being disposed "on" another member, one member and another member may be in contact with each other, or a third member may be interposed between one member and another member.

Throughout the specification, "including" one component is to be understood to imply the inclusion of another component rather than the exclusion of another component, unless explicitly described to the contrary. As used throughout the specification, a term of degree "about", "substantially", or the like is used to indicate the number of a stated meaning or its approximation when its manufacturing or material tolerance inherent therein are given. Such a term is used to prevent unscrupulous infringers from unfairly using the present invention in which exact or absolute figures are stated to facilitate the understanding of this application. As used throughout the specification, a term of a "step of (doing)" or a "step of~" does not indicate a "step for~".

Hereinafter, the embodiments of the present invention are described in detail with reference to the accompanying drawings and the descriptions provided below. However, the present invention is not limited to the embodiments described herein, and may also be embodied in another form. The same reference numerals denote the same components throughout the specification.

Hereinafter, the description describes a cooling guide structure of a motor according to an embodiment of the present invention.

Figure 3:
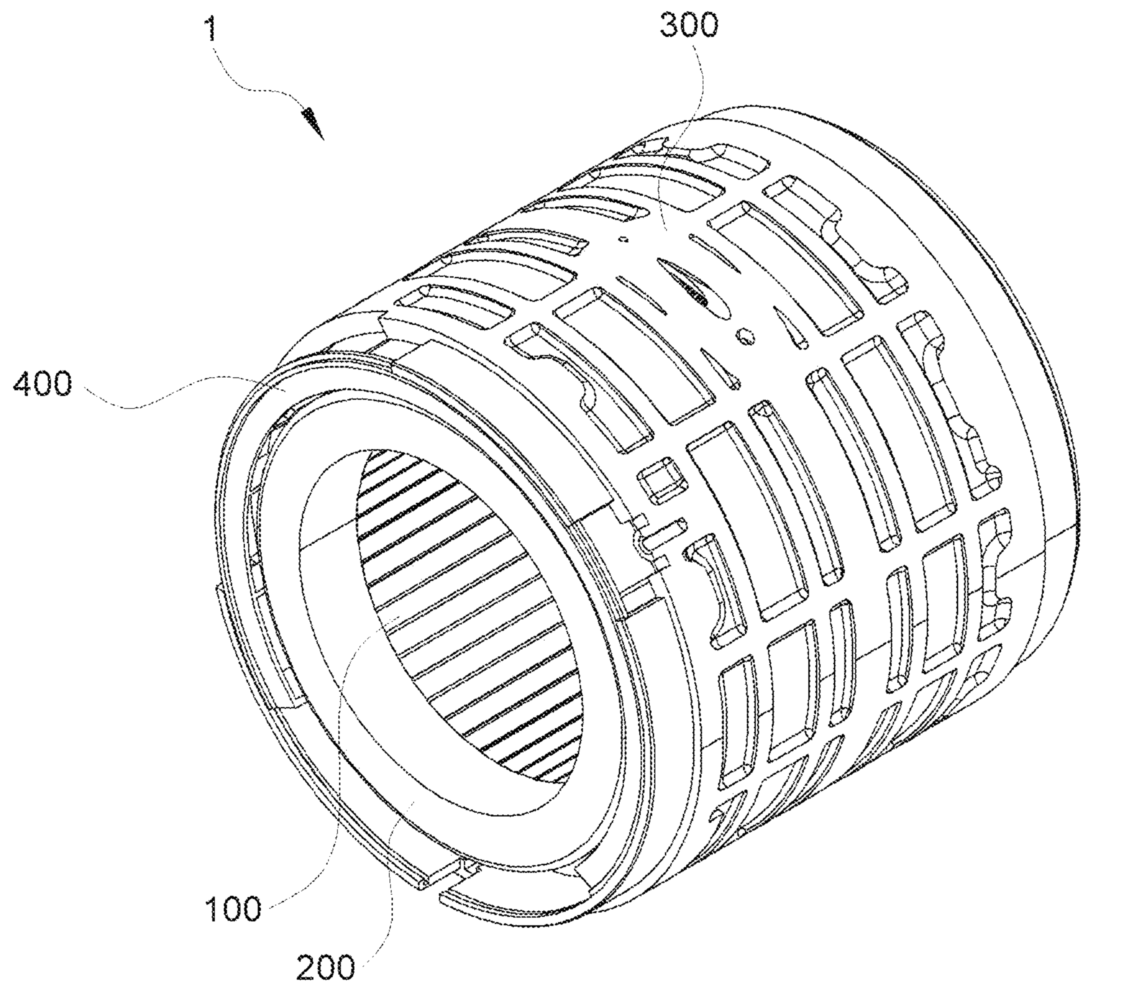
FIG. 3 is a view showing a cooling guide structure of a motor according to an embodiment of the present invention.

FIG. 3 is a view showing the cooling guide structure of the motor according to an embodiment of the present invention.

Referring to FIG. 3, a cooling guide structure 1 of the motor may include a stator core 100, a coil 200, a housing 300, and a cooling guide 400.

First, the description describes the stator core 100.

Figure 4:
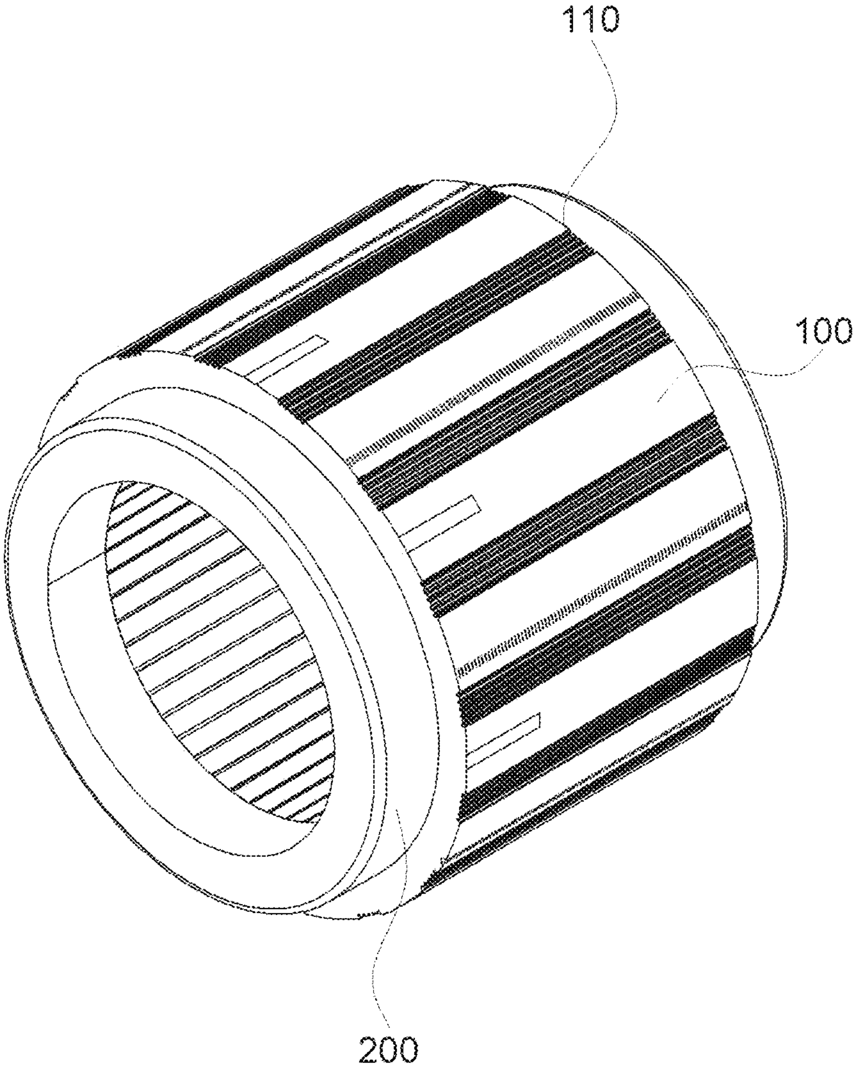
FIG. 4 is a view showing a stator core installed with a coil.

FIG. 4 is a view showing the stator core installed with the coil.

Referring to FIG. 4, the stator core 100 may be formed in a shape of a hollow cylinder extending in a length direction, and may be a stator core of a conventional motor.

In addition, the stator core 100 may have a plurality of first grooves 110 formed in its outer peripheral surface in the length direction.

Next, the description describes the coil 200.

Referring to FIG. 4, the coil 200 may be installed in the stator core 100 to have at least a portion protruding to one end of the stator core 100 in the length direction or the other end of the stator core 100 in the length direction, and may be a coil of the conventional motor.

Next, the description describes the housing 300.

Figure 5:
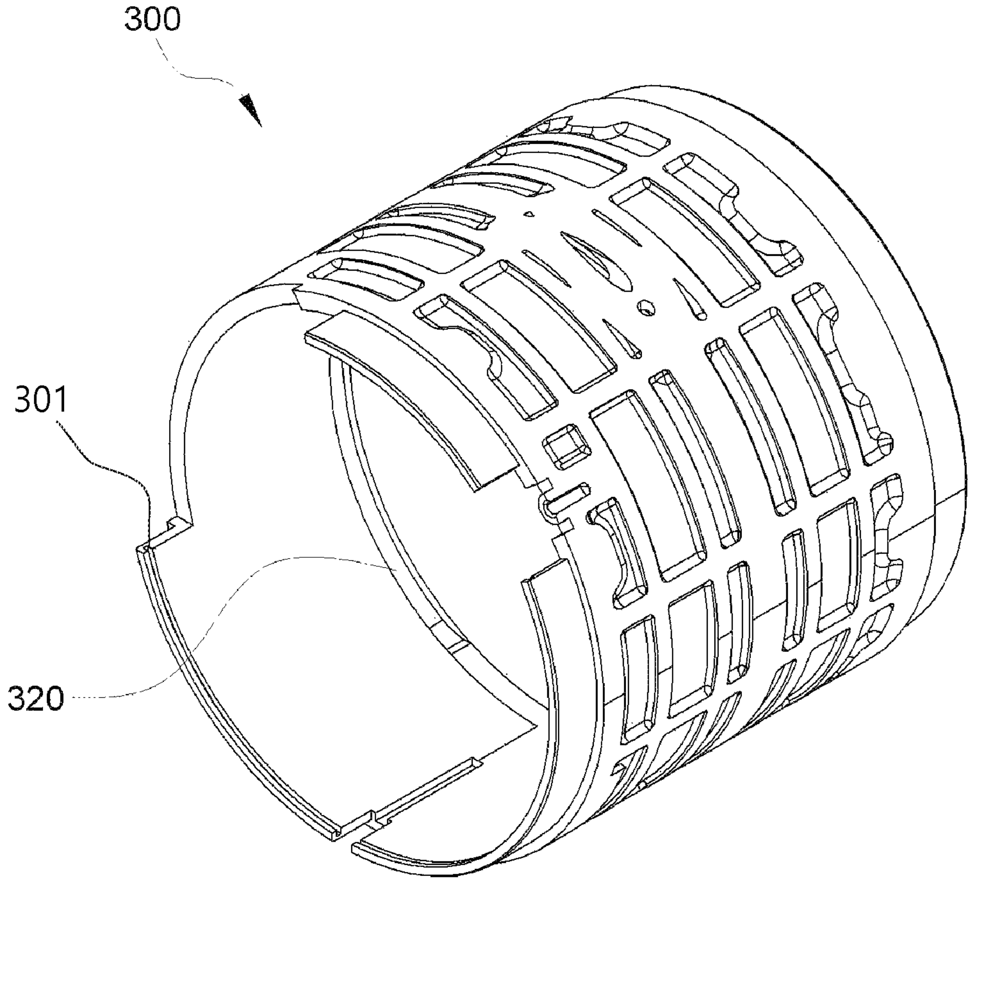
FIG. 5 is a view showing a housing.

FIG. 5 is a view showing the housing.

Referring to FIG. 5, the housing 300 may include an oil inlet formed in its outer peripheral surface and allowing oil to flow in, and have a second groove 320 formed in its inner peripheral surface and communicating with the oil inlet.

In addition, the housing 300 may be installed on the outer peripheral surface of the stator core 100 for oil flowing into the oil inlet and flowing through the second groove 320 to flow into the plurality of first grooves 110 and be discharged to one end of the stator core 100 in the length direction or the other end of the stator core 100 in the length direction.

Meanwhile, the housing 300 may have a coupling groove 301 which is formed in its inner peripheral surface and into which a coupling protrusion 401 of the cooling guide 400 described below may be inserted.

Next, the description describes the cooling guide 400.

Figure 6:
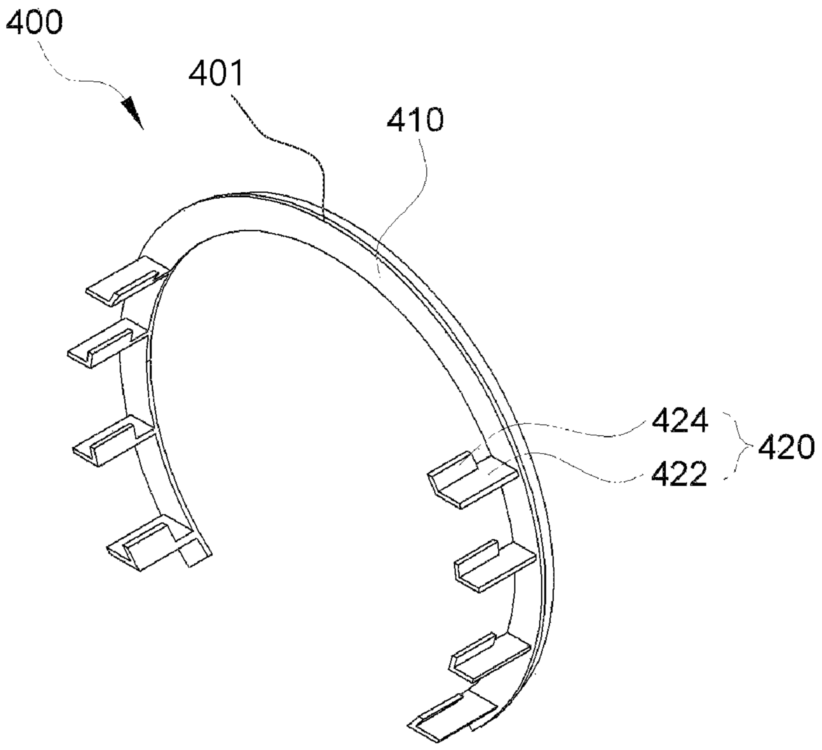
FIG. 6 is a view showing a cooling guide.

FIG. 6 is a view showing the cooling guide.

Referring to FIG. 6, the cooling guide 400 may have a first surface 410 and a second surface opposing the first surface 410, may have a shape of a ring with a portion cut off, and may be installed at one end of the housing 300 in the length direction or the other end of the housing 300 in the length direction for the first side 410 to face the stator core 100.

In addition, the cooling guide 400 may be made of an elastic material and have the coupling protrusion 401 formed on its outer peripheral surface to be installed in the housing 300 as the coupling protrusion 401 is inserted into the coupling groove 301 of the housing 300 described above.

In addition, the cooling guide 400 may include a plurality of guide parts 420 guiding a movement of oil for oil discharged from the first groove 110 to be moved to the coil 200, and the guide part 420 may be formed on the other part of the cooling guide 400 except for its upper part.

FIG. 7 is a view for explaining a position where the guide part is formed on the cooling guide.

In detail, referring to FIG. 7, the cooling guide 400 may have the upper part defined as a part disposed between the first point 430 and second point 440 of the cooling guide 400.

In addition, the upper part may have an angle of 30 degrees or more and 90 degrees or less between a first line segment L1 passing through the center C of the cooling guide 400 and extending in a direction parallel to gravity and a second line segment L2 passing through the first point 430 and the center C of the cooling guide 400.

In addition, the upper part may have the angle of 30 degrees or more and 90 degrees or less between the first line segment L1 and a third line segment L3 passing through the second point 440 and the center C of the cooling guide 400.

When oil is discharged from the first groove 110 hits the first surface 410 of the upper part of the cooling guide 400, oil may fall downward by the gravity to thus be moved to the coil 200 disposed therebelow. Therefore, oil discharged to the upper part of the cooling guide 400 may smoothly perform a function of cooling the coil 200 even when the guide part 420 is formed on the other part of the cooling guide 400 except its upper part.

The guide part 420 may include a first member 422 and a second member 424.

As shown in FIG. 6, the first member 422 may protrude from the first surface 410 and may be disposed to be flat in a direction perpendicular to the gravity.

FIG. 8 is a cross-sectional view showing a portion of the cooling guide structure of the motor.

In addition, as shown in FIG. 8, the first member 422 may face an outer peripheral surface of the coil 200, may be in close contact with the inner peripheral surface of the housing 300, and spaced apart from the coil 200 by a first distance when the cooling guide 400 is installed in the housing 300.

Here, the cooling guide 400 installed at one end of the housing 300 in the length direction may have the first surface 410 disposed to be further from the stator core 100 than one end of the coil 200 in the length direction, and the cooling guide 400 installed at the other end of the housing 300 in the length direction may have the first surface 410 disposed to be further from the stator core 100 than the other end of the coil 200 in the length direction.

As shown in FIG. 6, the second member 424 may protrude upward from the first member 422.

In addition, as shown in FIG. 8, the second member 424 may be spaced apart from the coil 200 by a second distance when the cooling guide 400 is installed in the housing 300.

As described above, the cooling guide structure may include the first member 422, the second member 424, and the cooling guide 400 including these members. As a result, oil accommodated in an upper part of the first member 422 may be moved to one end of the coil 200 in the length direction, the other end of the coil 200 in the length direction, and a portion of the coil 200 that faces the first member 422. That is, oil may be moved to the front part and side part of the coil 200.

In addition, the guide part 420 may be formed on the cooling guide 400 to effectively accommodate oil discharged from the first groove 110.

FIG. 9 is a view for explaining the position where the guide part of the cooling guide is formed based on a position of the first groove of the stator core.

For example, as shown in FIG. 9, in the guide part 420, an upper surface of the first member 422 may be spaced apart in a downward manner by a predetermined distance from one end or the other end of the first groove 110.

When the guide part 420 is formed as described above, oil discharged from the first groove 110 may be effectively accommodated in the guide part 420 and then be moved to the front part and side part of the core 200 to thus effectively cool the core 200.

Meanwhile, the second member 424 may be formed in various shapes.

FIG. 10 is a cross-sectional view showing a portion of the cooling guide structure of the motor that is provided with the guide part including the second member formed in a shape of a plurality of plates.

For example, as shown in FIG. 10, the second member 424 may be formed in the shape of the plurality of plates disposed on one side of the first member 422 that is adjacent to the coil 200 to face the coil 200 while being spaced apart from each other for oil accommodated in the first member 422 to be discharged to one end of the coil 200 in the length direction, the other end of the coil 200 in the length direction, and a portion of the coil 200 that faces the first member 422.

FIG. 11 is a cross-sectional view showing a portion of the cooling guide structure of the motor that is provided with the guide part including the second member formed in a shape of a plate inclined at a predetermined angle with respect to the length direction.

For another example, as shown in FIG. 11, the second member 424 may be formed in the shape of at least one plate inclined at the predetermined angle with respect to the length direction for oil accommodated in the first member 422 to be discharged to one end of the coil 200 in the length direction, the other end of the coil 200 in the length direction, and a portion of the coil 200 that faces the first member 422.

FIG. 12 is a cross-sectional view showing a portion of the cooling guide structure of the motor that is provided with the guide part including the second member formed in a shape of a curved plate.

For still another example, as shown in FIG. 12, the second member 424 may be formed in the shape of at least one plate inclined at the predetermined angle with respect to the length direction so that oil accommodated in the first member 422 is discharged to the one end of the coil 200 in the length direction, the other end of the coil 200 in the length direction, and a portion of the coil 200 that faces the first member 422, and may be formed in the shape of the curved plate so that oil may flow with a little resistance.

In addition, the first member 422 may also have a shape different from the shapes described above.

FIG. 13 is a view showing the cooling guide of the motor provided with the guide part including the first member inclined downward.

For example, referring to FIG. 13, the first member 422 may protrude from the first surface 410, and may be disposed to be flat to be inclined at the predetermined angle with respect to a plane perpendicular to the gravity.

Here, as shown in FIG. 13, the guide parts 420 may respectively be inclined downward toward the first line segment L1 passing through the center C of the cooling guide 400 and parallel to the gravity, and symmetrical to each other based on the first line segment L1.

When the first member 422 is inclined as described above, oil accommodated in the first member 422 may be moved more easily toward the coil 200.

As described above, the cooling guide structure of the motor according to the present invention may cool the coil more effectively by also cooling the lower part of the coil with oil because the cooling guide includes the guide part formed in the other part except for the upper part of the cooling guide to thus spray oil also to the lower part of the coil.

In addition, the cooling guide structure of the motor according to the present invention may cool the coil more effectively by also cooling the side part of the coil with oil because the guide part formed in the cooling guide that may discharge oil also to the side part of the coil.

According to the technical solution of the present invention described above, the cooling guide structure of the motor according to the present invention may cool the coil more effectively in such a way that the cooling guide includes the guide part formed in the other part except for the upper part of the cooling guide to thus spray oil also to the lower part of the coil, thereby also cooling the lower part of the coil with oil.

In addition, the cooling guide structure of the motor according to the present invention may cool the coil more effectively by also cooling the side part of the coil with oil because the guide part formed in the cooling guide that may discharge oil also to the side part of the coil.

The above-described embodiments are illustratively provided, and it is apparent to those skilled in the art to which the present invention pertains that the present invention may be embodied in another specific form without any change in the technical idea or essential feature of the present invention. Therefore, it is to be understood that the embodiments described above are illustrative rather than restrictive in all aspects. For example, the components each described as a single type may also be implemented in a distributed manner, and similarly, the components described as being distributed from each other may also be implemented in a combined manner.

It is to be understood that the scope of the present invention is defined by the claims disclosed below rather than the detailed description provided above, and includes all alternations and modifications derived from the claims and their equivalents.

What is claimed is:

1. A cooling guide structure of a motor, the structure comprising:

a stator core having a shape of a hollow cylinder extending in a length direction, and having a plurality of first grooves disposed in an outer peripheral surface of the stator core in the length direction;

a coil installed in the stator core to have at least a portion protruding to one end of the stator core in the length direction or the other end of the stator core in the length direction;

a housing including an oil inlet disposed in an outer peripheral surface of the housing and allowing oil to flow in, having a second groove disposed in an inner peripheral surface of the housing and communicating with the oil inlet, and installed on the outer peripheral surface of the stator core for the oil flowing into the oil inlet and flowing through the second groove to flow into the plurality of first grooves and be discharged to the one end of the stator core in the length direction or the other end of the stator core in the length direction; and a cooling guide having a first surface and a second surface, having a shape of a ring with a portion cut off, installed at one end of the housing in the length direction or the other end of the housing in the length direction for the first surface to face the stator core, and including a plurality of guide parts guiding a movement of oil for oil discharged from the plurality of first grooves to be moved to the coil, wherein each of the plurality of guide parts includes:

a first member protruding from the first surface and disposed to be flat in a direction perpendicular to gravity, and a second member protruding upward from the first member and guiding the movement of oil for oil accommodated in an upper part of the first member to be moved to the coil, the plurality of guide parts are disposed on a part of the cooling guide except for an upper part of the cooling guide, the cooling guide has the first member facing an outer peripheral surface of the coil, the cooling guide installed at the one end of the housing in the length direction has the first surface disposed to be further from the stator core than one end of the coil in the length direction, and the cooling guide installed at the other end of the housing in the length direction has the first surface disposed to be further from the stator core than the other end of the coil in the length direction.

2. The structure of claim 1, wherein the first member is in contact with the inner peripheral surface of the housing and spaced apart from the coil by a first distance when the cooling guide is installed in the housing, and the second member is spaced apart from the coil by a second distance when the cooling guide is installed in the housing.

3. The structure of claim 2, wherein the cooling guide has the upper part disposed between a first point and a second point of the cooling guide, an angle between a first line segment passing through a center of the cooling guide and extending in a direction parallel to the gravity and a second line segment passing through the first point and the center of the cooling guide is 30 degrees or more and 90 degrees or less, and an angle between the first line segment and a third line segment passing through the second point and the center of the cooling guide is 30 degrees or more and 90 degrees or less.

4. The structure of claim 3, wherein upper surfaces of the first members of the plurality of guide parts are spaced apart in a downward manner by a predetermined distance from ends of the plurality of first grooves.

5. The structure of claim 4, wherein the second member has a shape of a plate disposed on one side of the first member that is adjacent to the coil to face the coil while being spaced apart from the first surface for oil accommodated in the first member to be discharged to the one end of the coil in the length direction, the other end of the coil in the length direction, and a portion of the coil that faces the first member.

6. The structure of claim 4, wherein the second member has a shape of a plurality of plates disposed on one side of the first member that is adjacent to the coil to face the coil while being spaced apart from each other for oil accommodated in the first member to be discharged to the one end of the coil in the length direction, the other end of the coil in the length direction, and a portion of the coil that faces the first member.

7. The structure of claim 4, wherein the second member has a shape of at least one plate inclined at a predetermined angle with respect to the length direction for oil accommodated in the first member to be discharged to the one end of the coil in the length direction, the other end of the coil in the length direction, and a portion of the coil that faces the first member.

8. The structure of claim 7, wherein the second member has a shape of a curved plate.

9. The structure of 1, wherein the housing has a coupling groove disposed in the inner peripheral surface of the housing, and the cooling guide has a coupling protrusion disposed on the outer peripheral surface of the cooling guide and is made of an elastic material to be installed in the housing as the coupling protrusion is inserted into the coupling groove.

10. A cooling guide structure of a motor, the structure comprising:

a stator core having a shape of a hollow cylinder extending in a length direction, and having a plurality of first grooves disposed in an outer peripheral surface of the stator core in the length direction;

a coil installed in the stator core to have at least a portion protruding to one end of the stator core in the length direction or the other end of the stator core in the length direction;

a housing including an oil inlet disposed in an outer peripheral surface of the housing and allowing oil to flow in, having a second groove disposed in an inner peripheral surface of the housing and communicating with the oil inlet, and installed on the outer peripheral surface of the stator core for oil flowing into the oil inlet and flowing through the second groove to flow into the plurality of first grooves and be discharged to the one end of the stator core in the length direction or the other end of the stator core in the length direction; and a cooling guide having a first surface and a second surface, having a shape of a ring with a portion cut off, installed at one end of the housing in the length direction or the other end of the housing in the length direction for the first surface to face the stator core, and including a plurality of guide parts guiding a movement of oil for oil discharged from the plurality of first grooves to be moved to the coil, wherein each of the plurality of guide parts includes:

a first member protruding from the first surface being flat and inclined at a predetermined angle with respect to a plane perpendicular to gravity, and a second member protruding upward from the first member and guiding the movement of oil for oil accommodated in an upper part of the first member to be moved to the coil, the plurality of guide parts are disposed on the other part of the cooling guide except for an upper part of the cooling guide, the plurality of guide parts have the first members respectively inclined downward toward a first line segment passing through a center of the cooling guide and parallel to gravity, and symmetrical to each other based on the first line segment, the cooling guide has the first member facing an outer peripheral surface of the coil, the cooling guide installed at the one end of the housing in the length direction has the first surface disposed to be further from the stator core than one end of the coil in the length direction, and the cooling guide installed at the other end of the housing in the length direction has the first surface disposed to be further from the stator core than the other end of the coil in the length direction.

11. The structure of claim 10, wherein the first member is in contact with the inner peripheral surface of the housing and spaced apart from the coil by a first distance when the cooling guide is installed in the housing, and the second member is spaced apart from the coil by a second distance when the cooling guide is installed in the housing.

12. The structure of claim 11, wherein the cooling guide has the upper part disposed between the first point and second point of the cooling guide, an angle between the first line segment and a second line segment passing through the first point and the center of the cooling guide is 30 degrees or more and 90 degrees or less, and an angle between the first line segment and a third line segment passing through the second point and the center of the cooling guide is 30 degrees or more and 90 degrees or less.

13. The structure of claim 12, wherein upper surfaces of the first members of the plurality of guide parts are spaced apart in a downward manner by a predetermined distance from ends of the plurality of first grooves.

14. The structure of claim 13, wherein the second member has a shape of a plate disposed on one side of the first member that is adjacent to the coil to face the coil while being spaced apart from the first surface for oil accommodated in the first member to be discharged to the one end of the coil in the length direction, the other end of the coil in the length direction, and a portion of the coil that faces the first member.

15. The structure of 10, wherein the housing has a coupling groove disposed in the inner peripheral surface of the housing, and the cooling guide has a coupling protrusion disposed on the outer peripheral surface of the cooling guide and is made of an elastic material to be installed in the housing as the coupling protrusion is inserted into the coupling groove.

* * * * *